United States Patent
Aggarwal et al.

(10) Patent No.: US 12,549,813 B2
(45) Date of Patent: Feb. 10, 2026

(54) MEDIA CONTENT ITEM RECOMMENDATIONS BASED ON PREDICTED USER INTERACTION EMBEDDINGS

(71) Applicant: ROKU, INC., San Jose, CA (US)

(72) Inventors: Pulkit Aggarwal, San Jose, CA (US); Fei Xiao, San Jose, CA (US); Abhishek Bambha, Burlingame, CA (US); Rohit Mahto, San Jose, CA (US); Rameen Mahdavi, San Jose, CA (US); Nam Vo, San Jose, CA (US); Amit Verma, Sunnyvale, CA (US)

(73) Assignee: Roku, Inc., San Jose, CA (US)

( * ) Notice: Subject to any disclaimer, the term of this patent is extended or adjusted under 35 U.S.C. 154(b) by 54 days.

(21) Appl. No.: 18/524,831

(22) Filed: Nov. 30, 2023

(65) Prior Publication Data
US 2025/0184571 A1   Jun. 5, 2025

(51) Int. Cl.
*H04N 21/466* (2011.01)
*G06N 3/02* (2006.01)
*H04N 21/84* (2011.01)

(52) U.S. Cl.
CPC ........... *H04N 21/4666* (2013.01); *G06N 3/02* (2013.01); *H04N 21/84* (2013.01)

(58) Field of Classification Search
CPC ......... H04N 21/23418; H04N 21/4665; H04N 21/4666
See application file for complete search history.

(56) References Cited

U.S. PATENT DOCUMENTS

| | | | | |
|---|---|---|---|---|
| 10,165,315 | B2* | 12/2018 | Epstein | H04N 21/25891 |
| 10,191,990 | B2* | 1/2019 | Sayyadi-Harikandehei | G06F 16/9535 |
| 11,463,772 | B1* | 10/2022 | Wanjari | H04N 21/4394 |
| 2017/0164011 | A1* | 6/2017 | Rimon | G06F 16/353 |
| 2020/0177942 | A1* | 6/2020 | Wu | G06F 16/3347 |
| 2023/0328323 | A1* | 10/2023 | Jain | H04N 21/4668 725/14 |
| 2024/0196066 | A1* | 6/2024 | Xue | H04N 21/233 |

* cited by examiner

*Primary Examiner* — Jason Salce
(74) *Attorney, Agent, or Firm* — Sterne, Kessler, Goldstein & Fox P.L.L.C.

(57) ABSTRACT

Disclosed herein are system, method and/or computer program product embodiments, and/or combinations and subcombinations thereof, for recommending content items. For example, a first content item unassociated with interaction-based data is determined. A description-based representation of the first content item, an image-based representation of the first content item, and/or a metadata-based representation of the first content item is obtained from machine learning model(s). Such representation(s) are provided as an input to a neural network. A first interaction-based representation of the first content item based on such representation(s) is received as an output from the neural network. A measure of similarity is determined between the first interaction-based representation and second interaction-based representation(s) of second content item(s). A determination is made, based on the measure of similarity, that the first content item is to be recommended, and an indication recommending the first content item is outputted.

20 Claims, 7 Drawing Sheets

MEDIA CONTENT ITEM RECOMMENDATIONS BASED ON PREDICTED USER INTERACTION EMBEDDINGS

BACKGROUND

Field

This disclosure is generally directed to computer-implemented systems that generate recommendations for media content items.

SUMMARY

Provided herein are system, apparatus, article of manufacture, method and/or computer program product embodiments, and/or combinations and sub-combinations thereof, for recommending media content items. For example, a first media content item, from a plurality of media content items, that is unassociated with interaction-based data is determined. At least one of a description-based representation of the first media content item, an image-based representation of the first media content item, or a metadata-based representation of the first media content is obtained from at least one machine learning model. The at least one of the description-based representation of the first media content item, the image-based representation of the first media content item, or the metadata-based representation of the first media content item is provided as an input to a neural network. A first interaction-based representation of the first media content item based on at least one of the description-based representation, the image-based representation, or the metadata-based representation is received as an output from the neural network. A measure of similarity is determined between the first interaction-based representation and one or more second interaction-based representations of one or more second media content items of the plurality of media content items. A determination is made, based on the measure of similarity, that the first media content item is to be recommended. An indication of the first media content item is outputted responsive to the determination that the first media content item is to be recommended, the indication recommending the first media content item.

In an embodiment, the description-based representation of the first media content item is a description-based embedding representative of a plot description of the first media content item.

In another embodiment, the image-based representation of the first media content item is an image-based embedding representative of a thumbnail image associated with the first media content item.

In yet another embodiment, the metadata-based representation of the first media content item is a metadata-based embedding representative of at least one of a title of the first media content item, a category of the first media content item indicative of a media type of the first media content item, a genre of the first media content item, a rating of the first media content item, or names of cast and crew members associated with the first media content item.

In still another embodiment, each of the one or more second interaction-based representations of the one or more second media content items is an embedding representative of at least one interaction by the consumer with a corresponding second media content item of the one or more second media content items, and the at least one interaction comprises the consumer clicking on a graphical user interface representation of the corresponding second media content item, the consumer selecting the corresponding second media content item for playback, or the consumer being shown the graphical user interface representation of the corresponding second media content based on a submission of a search query.

In a further embodiment, determining the measure of similarity comprises determining a cosine similarity between the first interaction-based representation and the one or more second interaction-based representations, wherein the measure of similarity corresponds to the cosine similarity.

In yet a further embodiment, the at least one machine learning model comprises a multimodal machine learning model and a graph-based machine learning model, and obtaining, from the at least one machine learning model, at least one of the description-based representation of the first media content item, the image-based representation of the first media content item, or the metadata-based representation of the first media content item comprises obtaining, from the multimodal machine learning model, at least one of the description-based representation of the first media content item and the image-based representation of the first media content item, and obtaining, from the graph-based machine learning model, or the metadata-based representation of the first media content item.

In a further embodiment, wherein the multimodal machine learning model is a contrastive language-image pre-training (CLIP)-based multimodal machine learning model.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Recommendation systems attempt to identify and recommend items of interest for a user from a vast catalog of items. The recommendations may be based on a comparison of the user's profile to various reference characteristics. Such characteristics may be related to item characteristics or the past interactions of the user with respect to the items. Such recommendation systems suffer from a cold start problem for new items that are added to the catalog, where no past interactions for the new items exist. One approach to combat this problem is to couple collaborative filtering techniques with content-based filtering techniques. However such an approach can be expensive in terms of consumed processor cycles, memory and other computing resources.

Embodiments described herein may address some or all of the foregoing issues related to recommendation systems. For instance, a media content item that was not previously interacted with by a user (e.g., a consumer) is determined. Various representations (e.g., embeddings) associated with the media content item (including, but not limited to, representations of a plot summary of the media content item, an image representative of the media content item, and/or metadata of the media content item) are inputted to a neural network that is trained to map such representations to existing interaction data (e.g., interaction embeddings) associated with other media content items. That is, the neural network effectively predicts an interaction embedding for a media content item for which no user interaction data exists. The predicted interaction embedding may be utilized to recommend the media content item to a consumer of media content items, for example, via graphical user interface (GUI).

For example, in embodiments, a first media content item, from a plurality of media content items, that is unassociated with interaction-based data is determined. At least one of a description-based representation of the first media content item, an image-based representation of the first media content item, or a metadata-based representation of the first media content item is obtained from at least one machine learning model. The at least one of the description-based representation of the first media content item, the image-based representation of the first media content item, or the metadata-based representation of the first media content item is provided as an input to a neural network. A first interaction-based representation of the first media content item based on at least one of the description-based representation, the image-based representation, or the metadata-based representation is received as an output from the neural network. A measure of similarity is determined between the first interaction-based representation and one or more second interaction-based representations of one or more second media content items of the plurality of media content items. A determination is made, based on the measure of similarity, that the first media content item is to be recommended. An indication of the first media content item is outputted responsive to the determination that the first media content item is to be recommended, the indication recommending the first media content item.

By predicting an interaction embedding for a media content item and utilizing that interaction embedding for recommendations, the embodiments described herein solve the aforementioned cold start problem, as the predicted interaction embedding may be utilized to make recommendations for a consumer. In addition, certain embeddings provided to the neural network may be generated using a multimodal machine learning model (e.g., a contrastive language-image pre-training (CLIP)-based machine learning). Such a multimodal machine learning model may be trained on an existing set of text-image pairs, thereby reducing the need for expensive large and labelled datasets during training. Accordingly, such an approach improves the functioning of a device, as the expenditure of computing resources (e.g., processor cycles, memory, etc.) is reduced during training.

Figure 1:
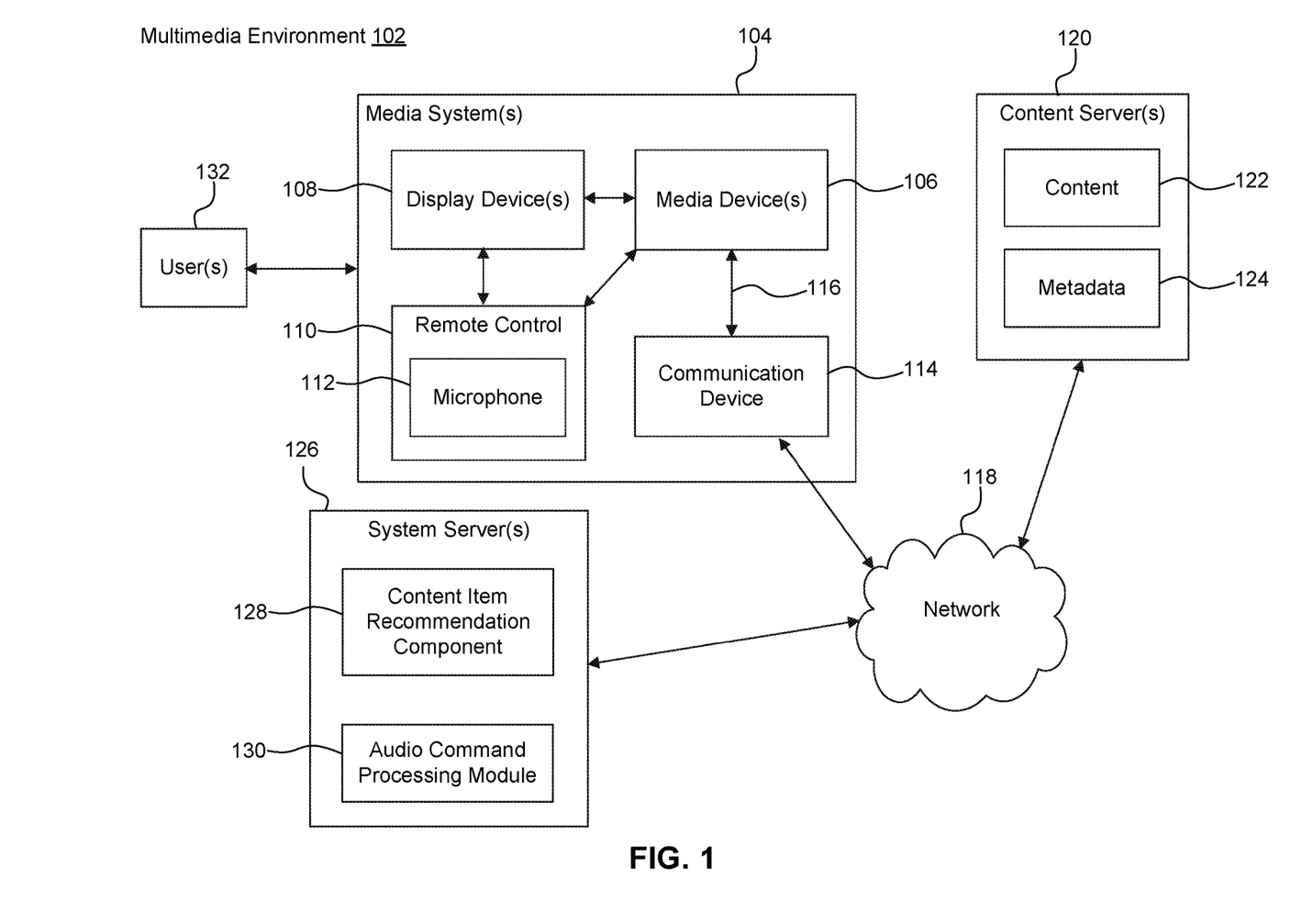
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106 and/or display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106 and/or display device 108 using cellular, Bluetooth, infrared, etc., or any combination thereof. Remote control 110 may include a microphone 112, which is further described below.

Multimedia environment 102 may include a plurality of content servers 120 (also called content providers, channels or sources 120). Although only one content server 120 is shown in FIG. 1, in practice multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122.

Multimedia environment 102 may include one or more system servers 126. System servers 126 may operate to support media devices 106 from the cloud. It is noted that the structural and functional aspects of system servers 126 may wholly or partially exist in the same or different ones of system servers 126.

System servers 126 may include a content item recommendation component 128 that provides media content item recommendations for a user (e.g., a consumer of media content items). The recommendations may recommend particular media contents item for which the user not previously interacted with. For example, content item recommendation component 128 may determine a media content item that was not previously interacted with by a consumer. Various representations (e.g., embeddings) associated with the media content item (including, but not limited to, representations of a plot summary of the media content item, an image representative of the media content item and/or metadata of the media content item) are inputted to a neural network that is trained to map such representations to existing interaction data (e.g., interaction embeddings) associated with other media content items. That is, the neural network effectively predicts an interaction embedding for a media content item for which no user interaction data exists. The predicted interaction embedding may be utilized to recommend the media content item to a consumer of media content items, for example, via a GUI of media device(s) 106. Additional details regarding content item recommendation component 128 are described below with reference to FIG. 3.

System servers 126 may also include an audio command processing module 130. As noted above, remote control 110 may include microphone 112. Microphone 112 may receive audio data from users 132 (as well as other sources, such as the display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which then forwards the audio data to audio command processing module 130 in system servers 126. Audio command processing module 130 may operate to process and analyze the received audio data to recognize a verbal command of user 132. Audio command processing module 130 may then forward the verbal command back to media device 106 for processing. Audio command processing module 130 may also operate to process and analyze the received audio data to recognize a spoken query of user 132. Audio command processing module 130 may then forward the spoken query to content item recommendation component 128 for processing.

Figure 2:
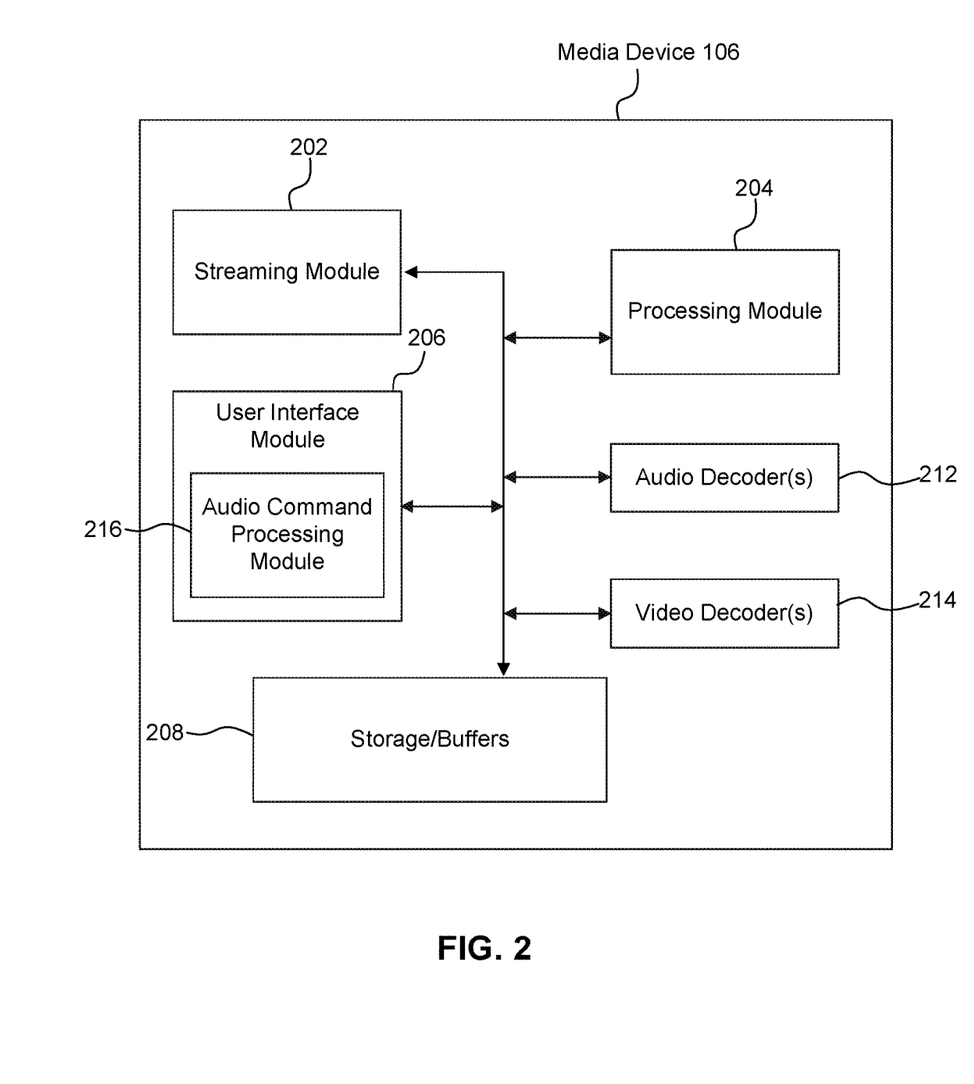
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands or spoken queries to process (either the verbal command or spoken query recognized by audio command processing module 130 in system servers 126, or the verbal command or spoken query recognized by audio command processing module 216 in media device 106).

FIG. 2 illustrates a block diagram of an example media device 106, according to some embodiments. Media device 106 may include a streaming module 202, a processing module 204, storage/buffers 208, and a user interface module 206. User interface module 206 may be configured to present a search interface associated with content item recommendation component 128 to user 132 via display device 108. Content item recommendations determined by content item recommendation component 128 may be provided to user interface module 206, for example, for presentation thereby. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select a media content item, such as a movie, TV show, music, book, application, game, etc. For example, user 132 may select a content item from among a list of content items generated by content item recommendation component 128, for example, based on query submitted by user 132. In response to the user selection, streaming module 202 of media device 106 may request the selected content item from content server(s) 120 over network 118. Content server(s) 120 may transmit the requested content item to streaming module 202. Media device 106 may transmit the received content item to display device 108 for playback to user 132.

In streaming embodiments, streaming module 202 may transmit the content item to display device 108 in real time or near real time as it receives such content item from content server(s) 120. In non-streaming embodiments, media device 106 may store the content item received from content server(s) 120 in storage/buffers 208 for later playback on display device 108.

Figure 3:
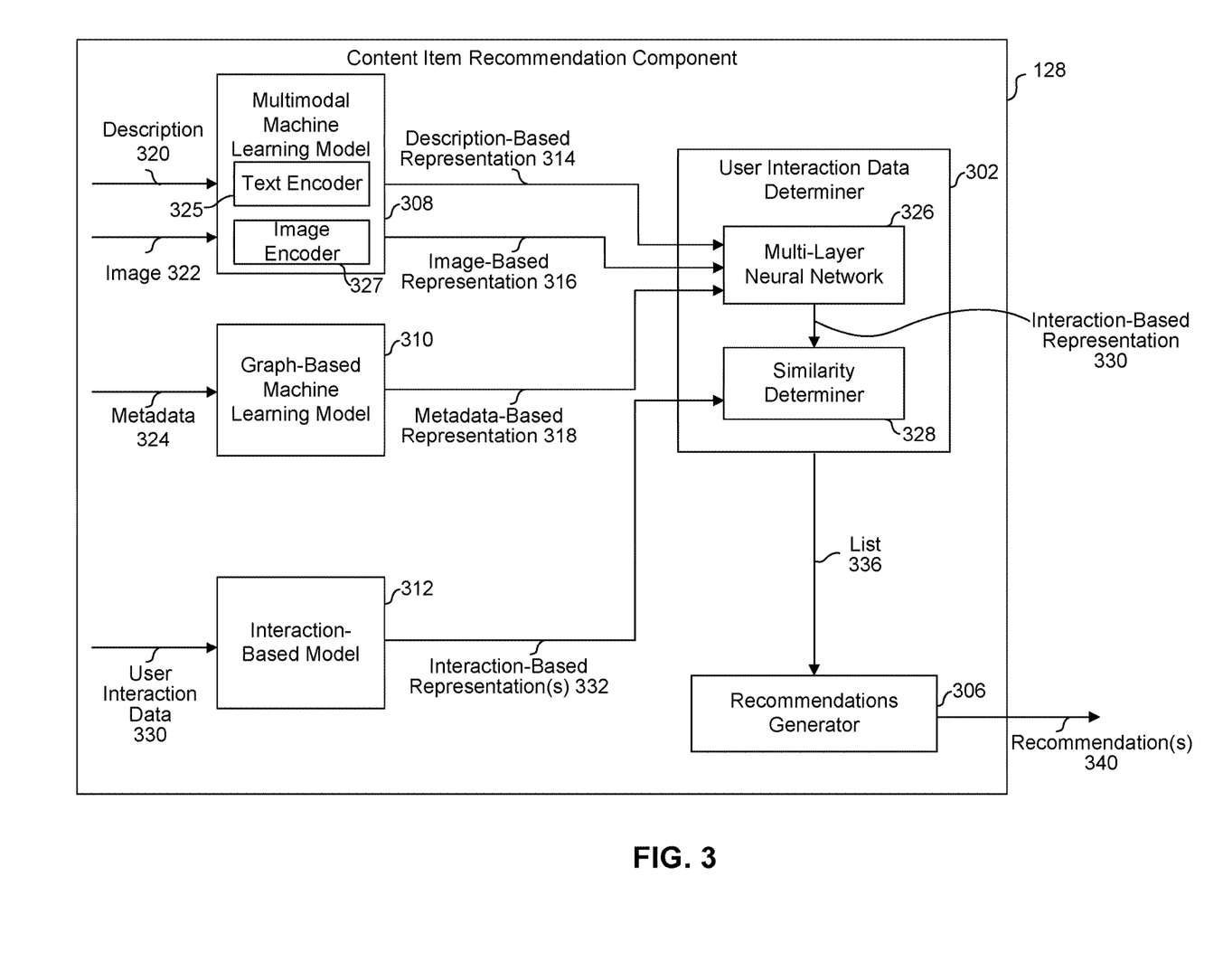
FIG. 3 illustrates a block diagram of a content item recommendation component, according to some embodiments.

Media Content Item Recommendations Based on Predicted User Interaction Embeddings FIG. 3 illustrates a block diagram of content item recommendation component 128, according to some embodiments. As noted above, in certain embodiments, content item recommendation component 128 may be implemented by system server(s) 126 in multimedia environment 102 of FIG. 1. In other embodiments, content item recommendation component 128 may be implemented by media device(s) 106. As will be discussed herein, content item recommendation component 128 may provide recommendations for media content items unassociated with any user interactions based on user interaction data associated with other media content items. Examples of media content items include, but are not limited to, a movie, TV show, music, book, application, game, etc. Examples of interactions include, but are not limited to, a user being shown a representation of and/or information about a media content item (e.g., responsive to submitting a search query), a user clicking on or otherwise interacting with a GUI control to obtain information about a media content item, or a user selecting the media content item for playback, etc.

As shown in FIG. 3, content item recommendation component 128 comprises a user interaction data determiner 302, a recommendations generator 306, a multimodal machine learning model 308, a graph-based machine learning model 310, and an interaction-based model 312.

User interaction determiner 302 is configured to determine user interaction data for media content items that are unassociated with interaction-based data. For example, user interaction data determiner 302 may query a data store (e.g., a database) that stores a plurality of media content items for media content items that are not associated with any interaction-based data. In another example, user interaction determiner 302 may receive a notification from the data store when a new media content item is added thereto (i.e., a media content item for which a user has not yet had an opportunity to interact therewith).

Upon determining that a particular media content item is unassociated with interaction-based data, user interaction determiner 302 may be configured to obtain various data representative of such media content item and predict an interaction-based representation therefor. For example, user interaction data determiner 302 may receive a description-based representation 314 of the media content item, an image-based representation 316 of the media content item, and/or a metadata-based representation 318 of the media content item. In an embodiment, description-based representation 318 may comprise an embedding representative of a plot description of the media content item, image-based representation 316 may comprise an embedding representative of a thumbnail image that represents the media content item, and metadata-based representation 318 may comprise an embedding representative of various metadata associated with the media content item. Examples of metadata include, but are not limited to, a title of the media content item, a category of the media content item indicative of a media type (e.g., a television show, a movie, etc.) of the first media content item, a genre (action, mystery, drama, comedy, etc.) of the media content item, a rating (e.g., a maturity rating) of the media content item, names of cast and crew members associated with the media content item, and/or the various types of metadata described above with reference to metadata 124.

Multimodal machine learning model 308 may be configured to generate description-based representation 314 for a particular media content item based on a text-image pair comprising a description 320 of the media content item and an image 322 representative of the media content item. Description 320 may comprise a text-based plot description (e.g., an abstract, a summary, etc.) of the media content item, and image 322 may comprise a thumbnail image representative of the media content item.

Multimodal machine learning model 308 may comprise a text encoder 325 and an image encoder 327. Text encoder 325 may be configured to receive, as an input, description 320 and generate description-based representation 314 based thereon. Text encoder 325 may comprise a transformer model (e.g., a Bidirectional Encoder Representations from Transformers (BERT)-based model), where activations of the highest layer of the transformer model are treated as the feature representation of description 320. The feature representation may be layer-normalized and linearly projected into a multimodal embedding space to generate description-based representation 314. Similarly, image encoder 327 may comprise a transformer model (e.g., a Vision Transformer model), where activations of the highest layer of the transformer model are treated as the feature representation of image 322. The feature representation may be layer-normalized and linearly projected into the multimodal embedding space to generate image-based representation 316.

In an embodiment, multimodal machine learning model 308 may comprise a contrastive language-image pre-training (CLIP)-based multimodal machine learning model, which is trained on a large corpus of text-image pairs of corresponding media content items. During training, the corpus of text-image pairs are provided to text encoder 325 and image encoder 327 simultaneously to generate representations (e.g., vector embeddings) of the text and associated image respectively. A model loss may be determined based on the vector embeddings for a given text-image pair as the different (e.g., contrast) between the two vector embeddings. Both text encoder 325 and image encoder 327 are then optimized to minimize this difference, and therefore, both learn how to embed similar pairs into a similar vector space. The result of such a contrastive training process is multimodal machine learning model 308.

Graph-based machine learning model 310 may be configured to generate metadata-based representation 318 for the particular media content item based on metadata 324 of the media content item. Metadata 324 may be in the form of one or more graphs (or one or more data structures representative thereof) representative of various metadata associated with a particular media content item. For instance, each node in the graph may represent a particular piece of metadata and each edge between a respective pair of nodes may represent a dependency between the metadata represented by the pair of nodes. For instance, a first node may be labelled "genre," and a second node connected to the first node via an edge may specify the type of genre of the media content item (e.g., "mystery"). Graph-based machine learning model 310 may comprise a graph neural network (GNN), which may be configured to generate a graph embedding, where the graph(s) representative of metadata for a particular media content item are mapped to metadata-based representation 318 (e.g., a vector embedding).

User interaction data determiner 302 may comprise a multi-layer neural network 326 and a similarity determiner 328. Multi-layer neural network 326 may be configured to receive, as inputs, description-based representation 314, image-based representation 316, and/or metadata-based representation 318, and map the inputs to one or more existing interaction-based embeddings for one or more media content items for which interaction-based data is already associated therewith (i.e., for media content item(s) that a user has interacted with, and therefore, is associated with interaction-based data).

Figure 4:
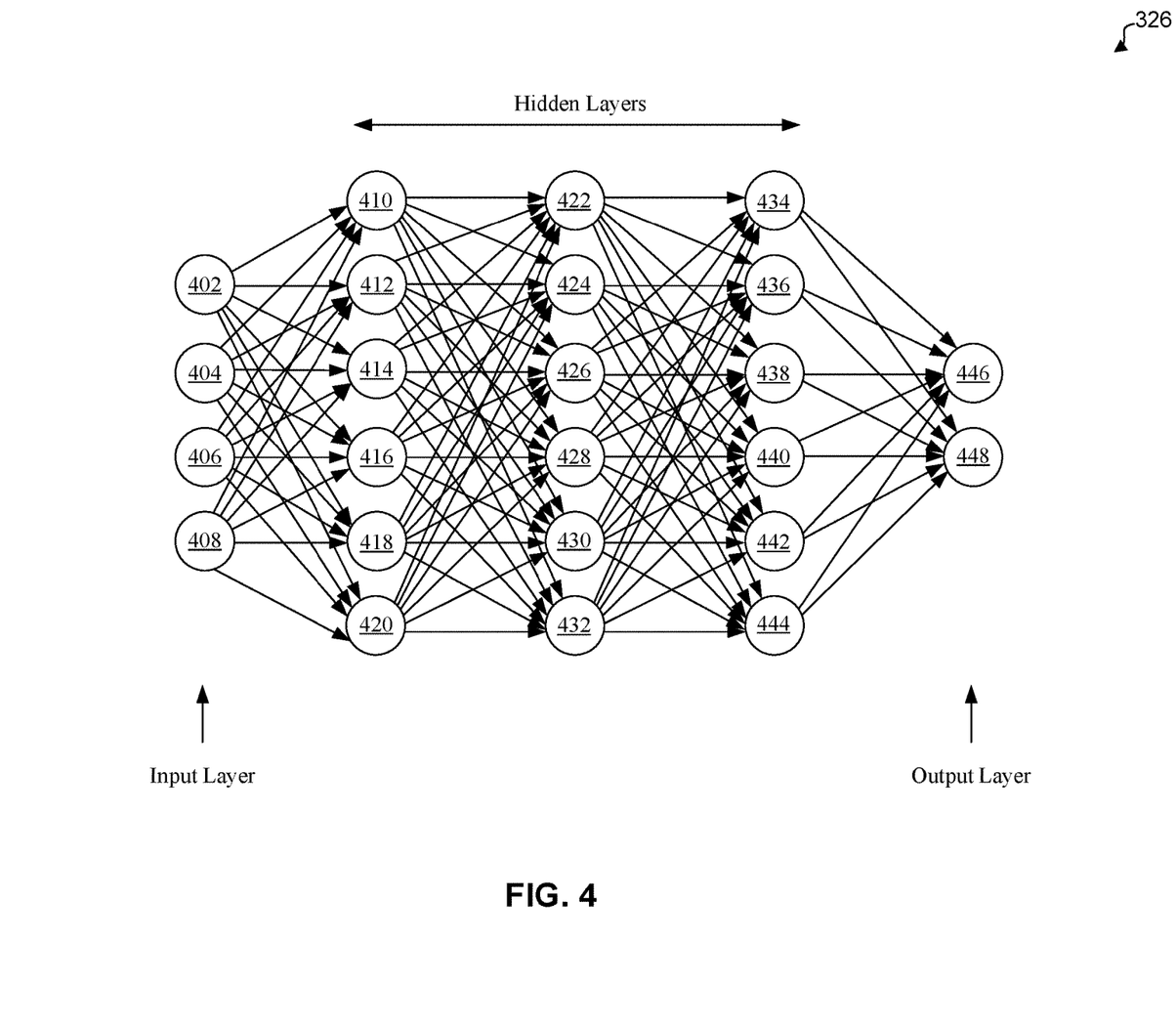
FIG. 4 illustrates a block diagram of a multi-layer neural network, according to some embodiments.

FIG. 4 illustrates a block diagram of multi-layer neural network 326, according to some embodiments. Multi-layer neural network 326 may be configured to predict an interaction-based representation of a particular media content item that is unassociated with interaction-based data based on description-based representation 314, image-based representation 316, and/or metadata-based representation 318. As shown in FIG. 4, multi-layer neural network 326 comprises a plurality of nodes 402-448 (also referred to as neurons). In the example shown in FIG. 4, multi-layer neural network 326 is depicted as a fully-connected feedforward neural network. However, it is noted that multi-layer neural network 326 may comprise other types of neural networks including, but not limited to, convolution neural networks, recurrent neural networks, etc.

Each node of nodes 402-448 may be associated with an edge coupling the node to another node of nodes 402-448. Each edge is associated with a weight, which emphasizes the importance of a particular node coupled thereto. The weights of multi-layer neural network 326 are initialized randomly and are learned through training on a training data set (e.g., description-based representations, image-based representations, and/or metadata-based representations of a plurality of media content items that are associated with interaction-based data). Multi-layer neural network 326 executes multiple times, changing its weights through backpropagation with respect to a loss function, which represents the difference between ground truth data and the output of multi-layer neural network 326. In essence, multi-layer neural network 326 tests data, makes predictions, and determines a score representative of its accuracy. Then, it uses this score to make itself slightly more accurate by updating the weights accordingly. Through this process, multi-layer neural network 326 can learn to improve the accuracy of its predictions.

Multi-layer neural network 326 generally comprises three parts: an input layer, one or more hidden layers, and an output layer, each of which comprising one or more nodes. Nodes 402, 404, 406, and 408 may represent the input layer, where input data (e.g., description-based representation 314, image-based representation 316, and/or metadata-based representation 318, as shown in FIG. 3) is received by multi-layer neural network 326. Nodes 410-420 may represent a first hidden layer, nodes 422-432 may represent a second hidden layer, and nodes 434-444 may represent a third hidden layer. It is noted that while three hidden layers are depicted in FIG. 4, multi-layer neural network 326 may utilize any number of hidden layers. Each node of the first hidden layer is fully connected to all the nodes of the input layer, each node of the second hidden layer is fully connected to all the nodes of the first hidden layer, and each node of the third hidden layer is fully connected to all the nodes of the second hidden layer. Each of the hidden layers may be configured to perform a particular operation (e.g., a linear activation, a rectified linear unit (ReLU) activation, a pooling operation, etc.) to compute a function over its inputs, for example, using learned parameters (or weights), thereby producing an input for the next layer. Nodes 446 and 448 may represent the output layer, which outputs the predicted (or ground truth) interaction-based representation (shown as interaction-based representation 330 in FIG. 3) for the media content item. The dimensionality of the output layer of multi-layer neural network 326 may be the same as the dimensionality of interaction-based representation 330.

Referring again to FIG. 3, the output of multi-layer neural network 326 (i.e., interaction-based representation 330) may be provided to similarity determiner 328. Similarity determiner 328 may be configured to determine a measure of similarity between interaction-based representation 330 and one or more interaction-based representations 332, which represent past interactions that the user has had with other media content items. In an embodiment, the measure of similarity may comprise a cosine similarity between interaction-based representation 330 and interaction-based representation(s) 332. However, it is noted that other measures of similarity may be utilized.

Interaction-based model 312 may be configured to generate interaction-based representation(s) 332 for one or more media content items for which a user has previously interacted with. Each of interaction-based representation(s) 332 may comprise an interaction-based embedding representative of at least one past interaction by the consumer with a corresponding media content item. In an embodiment, interaction-based model 312 may comprise a graph-based machine learning model that is trained on user interaction data 330, which may be derived from logs of past interactions between the user and media content items. Such past interactions may include, for example and without limitation, a user being shown a representation of and/or information about a media content item (e.g., responsive to submitting a search query), a user clicking on or otherwise interacting with a GUI control to obtain information about a media content item, or a user selecting the media content item for playback. In such an embodiment, interaction-based model 312 may comprise a GNN configured to learn embeddings for attributes of a graph in which the user and media content items are represented as nodes and in which relationships between users and media content items are represented as edges. It is noted that interaction-based model 312 may be based on other models, including, but not limited to, sequence-based models, collaborative filter-based models, etc.

Similarity determiner 328 may be configured to generate a list 336 identifying one or more content items associated with interaction-based representation(s) 332 that have a measure of similarity with interaction-based representation 330 that meets a predetermined threshold. In an embodiment, list 336 may identify the top N media content item(s) having interaction-based representation(s) 332 that meet the predetermined threshold, where N is any positive integer. Similarity determiner 328 may rank list 336 based on the determined measures of similarity of such media content item(s), for example, in ascending or descending order. Similarity determiner 328 may provide list 336 recommendations generator 306.

Recommendations generator 306 may be configured to receive list 336 and to generate recommendation(s) 340 based thereon. Recommendation(s) 340 may comprise, for example, information associated with each media content item identified in list 336 (e.g., a title of the media content item, an icon or image associated with the media content item, a content description associated with the media content item, a link that activates playback of the media content item, or the like). Recommendations generator 306 is further configured to transmit recommendation(s) 340 to media device 106, which causes user interface module 206 of media device 106 to display one or more indicators (e.g., one or more GUI controls) that recommends the media content item(s) corresponding to recommendation(s) 340. Media device 106 may present such information to user 132 via a search interface of user interface module 206 rendered to display device 108. In an embodiment, the search interface enables user 132 to interact with (e.g., click on) a first GUI control of user interface module 206 associated with each content item included within recommendation(s) 340 to obtain additional information about the corresponding content item and/or a second GUI control of user interface module 206 associated with each content item included within recommendation(s) 340 to play back (e.g., stream) the corresponding content item. In one example, recommendation(s) 340 may be generated responsive to receiving a search query submitted by a user for a media content item. In another example, recommendation(s) 340 may be periodically generated and provided to media device 106. In such an example, user interface module 206 may present the media content items corresponding to recommendations 230 as media content items that the consumer may be interested in watching (e.g., via a "Recommended Viewing" list).

Figure 5:
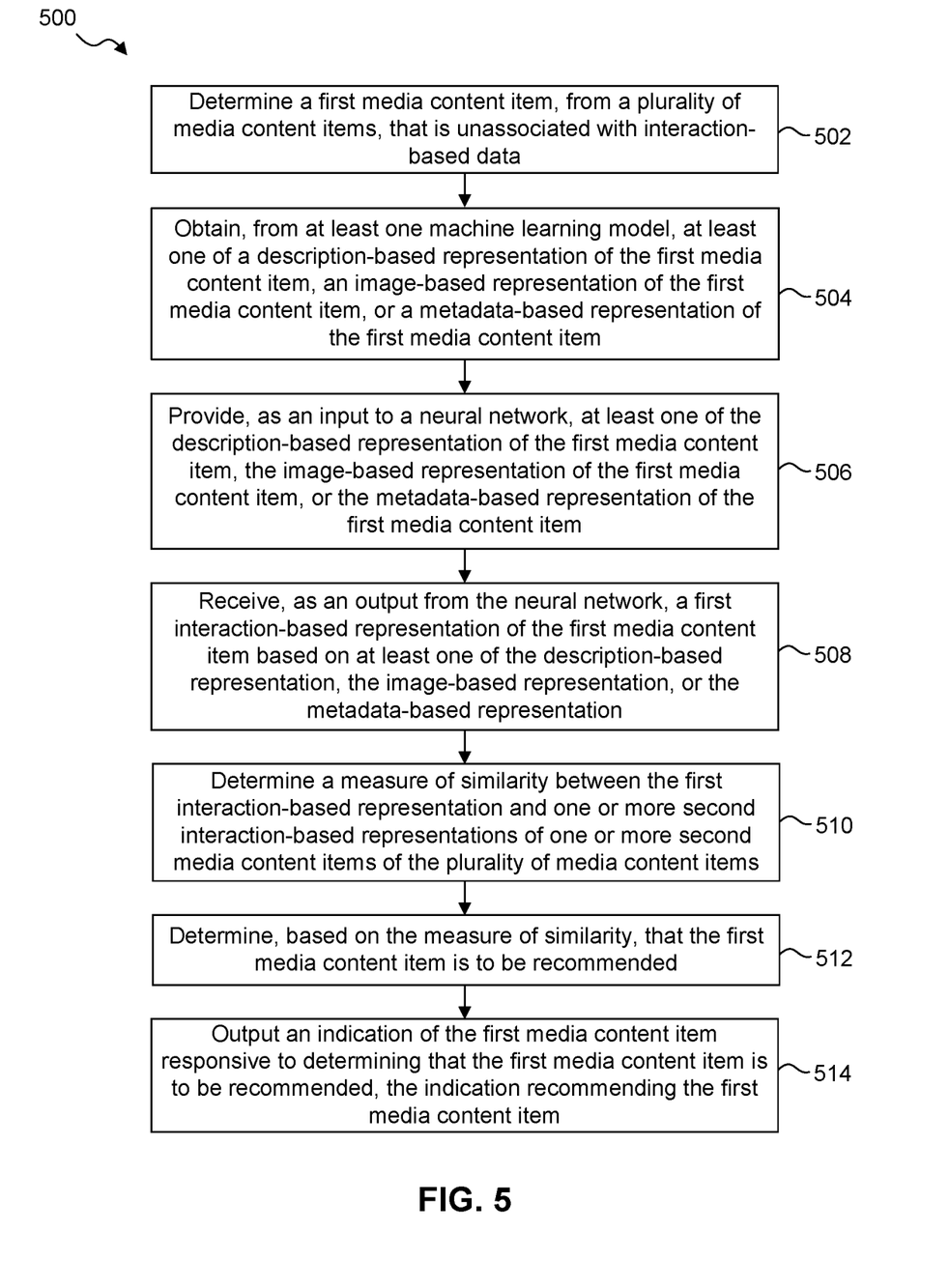
FIG. 5 illustrates a flow diagram of a method for recommending a media content item, according to some embodiments.

FIG. 5 is a flow diagram for a method 500 for recommending a media content item, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 1. However, method 500 is not limited to that example embodiment.

In 502, user interaction data determiner 302 may determine a first media content item, from a plurality of media content items, that is unassociated with interaction-based data.

In 504, user interaction data determiner 302 may obtain, from at least one machine learning model (e.g., multimodal machine learning model 308 and Graph-based machine learning model 310), at least one of description-based representation 314 of the first media content item, image-based representation 316 of the first media content item, or metadata-based representation 318 of the first media content item.

In an embodiment, description-based representation 314 of the first media content item is a description-based embedding representative of a plot description of the first media content item. In another embodiment, image-based representation 316 of the first media content item is an image-based embedding representative of a thumbnail image associated with the first media content item. In a further embodiment, metadata-based representation 318 of the first media content item is a metadata-based embedding representative of at least one of a title of the first media content item, a category of the first media content item indicative of a media type of the first media content item, a genre of the first media content item, a rating of the first media content item, or names of cast and crew members associated with the first media content item.

In 506, user interaction data determiner 302 may provide, as an input to neural network 326, at least one of description-based representation 314 of the first media content item, image-based representation 316 of the first media content item, or metadata-based representation 318 of the first media content item.

In 508, similarity determiner 328 may receive, as an output from neural network 326, a first interaction-based representation (e.g., interaction-based representation 330) of the first media content item based on at least one of description-based representation 314, image-based representation 316, or metadata-based representation 318.

In 510, similarity determiner 328 may determine a measure of similarity between the first interaction-based representation (e.g., interaction-based representation 330) and one or more second interaction-based representations (e.g., interaction-based representation(s) 332) of one or more second media content items of the plurality of media content items. For example, as described herein, similarity determiner 328 may determine the measure of similarity by determining a cosine similarity between first interaction-based representation 330 and second interaction-based representation(s) 332, wherein the measure of similarity corresponds to the cosine similarity.

In an embodiment, each of the second interaction-based representations (e.g., interaction-based representation(s) 332) of the one or more second media content items is an embedding representative of at least one interaction by the consumer with a corresponding second media content item of the one or more second media content items. The at least one interaction may comprise the consumer clicking on a graphical user interface representation of the corresponding second media content item, the consumer selecting the corresponding second media content item for playback, or the consumer being shown the graphical user interface representation of the corresponding second media content item based on a submission of a search query.

In 512, recommendations generator 306 may determine, based on the measure of similarity, that the first media content item is to be recommended.

In 514, recommendations generator 306 may output an indication (e.g., recommendation(s) 340) of the first media content item responsive to determining that the first media content item is to be recommended, the indication recommending the first media content item.

Figure 6:
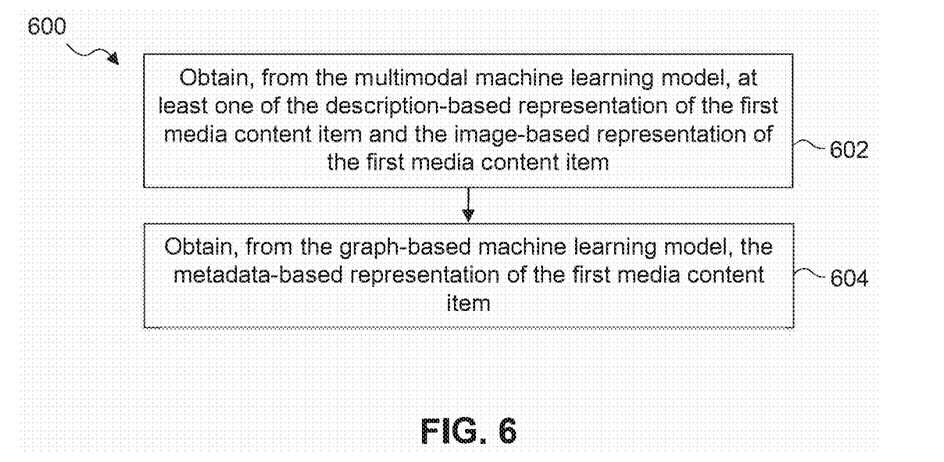
FIG. 6 illustrates a flow diagram of a method for obtaining a description-based representation of a media content item, an image-based representation of the media content item, and a metadata-based representation of the media content item via multiple machine learning models, according to some embodiments.

In an embodiment, the at least one machine learning model may comprise a multimodal machine learning model and a graph-based machine learning model. FIG. 6 is a flow diagram for a method 600 for obtaining a description-based representation of a media content item, an image-based representation of the media content item, and a metadata-based representation of the media content item via multiple machine learning models, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 1. However, method 600 is not limited to that example embodiment.

In 602, user interaction data determiner 302 may obtain, from multimodal machine learning model 308, at least one of description-based representation 314 of the first media content item and image-based representation 316 of the first media content item.

In 604, user interaction data determiner 302 may obtain, from graph-based machine learning model 310, metadata-based representation 318 of the first media content item.

Example Computer System

Figure 7:
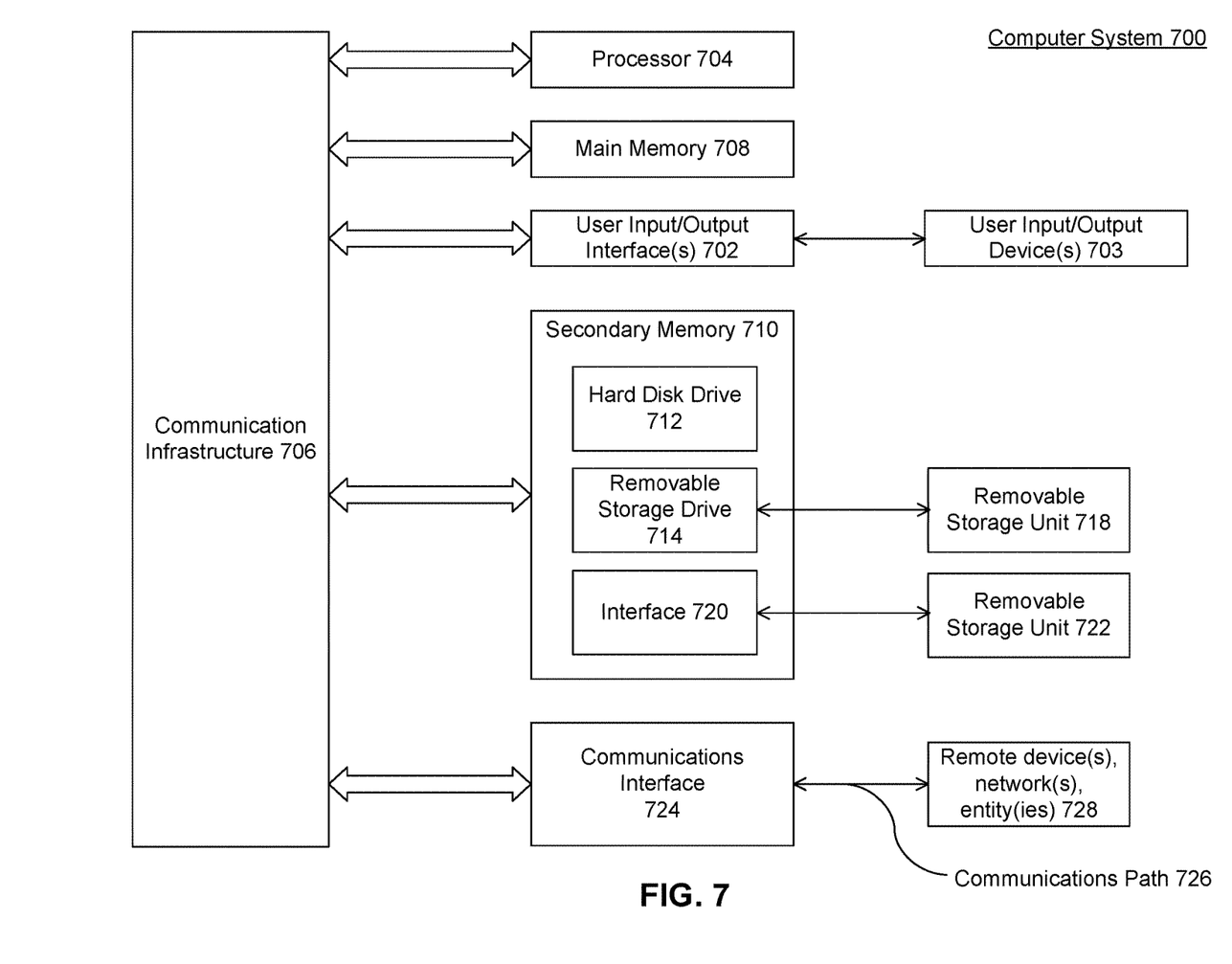
FIG. 7 illustrates an example computer system useful for implementing various embodiments.

Various embodiments may be implemented, for example, using one or more well-known computer systems, such as computer system 700 shown in FIG. 7. For example, one or more of media device 106, remote control 110, content servers 120, system servers 126, content item recommendation component 128, user interaction data determiner 302, recommendations generator 306, multi-layer neural network 326, similarity determiner 328, multimodal machine learning model 308, text encoder 325, image encoder 327, graph-based machine learning model 310, and interaction-based model 312 may be implemented using combinations or sub-combinations of computer system 700. Also or alternatively, one or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (Saas), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   determining, by at least one computer processor, a first media content item, from a plurality of media content items, that is unassociated with interaction-based data;
   obtaining, from at least one machine learning model, at least one of a description-based representation of the first media content item, an image-based representation of the first media content item, or a metadata-based representation of the first media content item;
   providing, as an input to a neural network, at least one of the description-based representation of the first media content item, the image-based representation of the first media content item, or the metadata-based representation of the first media content item;
   receiving, as an output from the neural network, a first interaction-based representation of the first media content item based on at least one of the description-based representation, the image-based representation, or the metadata-based representation;
   determining a measure of similarity between the first interaction-based representation and one or more second interaction-based representations of one or more second media content items of the plurality of media content items;
   determining, based on the measure of similarity, that the first media content item is to be recommended; and
   outputting an indication of the first media content item responsive to determining that the first media content item is to be recommended, the indication recommending the first media content item.

2. The computer-implemented method of claim 1, wherein the description-based representation of the first media content item is a description-based embedding representative of a plot description of the first media content item.

3. The computer-implemented method of claim 1, wherein the image-based representation of the first media content item is an image-based embedding representative of a thumbnail image associated with the first media content item.

4. The computer-implemented method of claim 1, wherein the metadata-based representation of the first media content item is a metadata-based embedding representative of at least one of:
   a title of the first media content item;
   a category of the first media content item indicative of a media type of the first media content item;
   a genre of the first media content item;
   a rating of the first media content item; or
   names of cast and crew members associated with the first media content item.

5. The computer-implemented method of claim 1, wherein each of the one or more second interaction-based representations of the one or more second media content items is an embedding representative of at least one interaction by a consumer with a corresponding second media content item of the one or more second media content items, and wherein the at least one interaction comprises:
   the consumer clicking on a graphical user interface representation of the corresponding second media content item;

the consumer selecting the corresponding second media content item for playback; or the consumer being shown the graphical user interface representation of the corresponding second media content based on a submission of a search query.

6. The computer-implemented method of claim 1, wherein determining the measure of similarity comprises:

determining a cosine similarity between the first interaction-based representation and the one or more second interaction-based representations, wherein the measure of similarity corresponds to the cosine similarity.

7. The computer-implemented method of claim 1, wherein the at least one machine learning model comprises a multimodal machine learning model and a graph-based machine learning model, and wherein obtaining, from the at least one machine learning model, at least one of the description-based representation of the first media content item, the image-based representation of the first media content item, or the metadata-based representation of the first media content item comprises:

obtaining, from the multimodal machine learning model, at least one of the description-based representation of the first media content item and the image-based representation of the first media content item; and obtaining, from the graph-based machine learning model, the metadata-based representation of the first media content item.

8. The computer-implemented method of claim 7, wherein the multimodal machine learning model is a contrastive language-image pre-training (CLIP)-based multimodal machine learning model.

9. A system, comprising:

one or more memories; and at least one processor each coupled to at least one of the one or more memories and configured to perform operations comprising:

determining a first media content item, from a plurality of media content items, that is unassociated with interaction-based data;

obtaining, from at least one machine learning model, at least one of a description-based representation of the first media content item, an image-based representation of the first media content item, or a metadata-based representation of the first media content item;

providing, as an input to a neural network, at least one of the description-based representation of the first media content item, the image-based representation of the first media content item, or the metadata-based representation of the first media content item;

receiving, as an output from the neural network, a first interaction-based representation of the first media content item based on at least one of the description-based representation, the image-based representation, or the metadata-based representation;

determining a measure of similarity between the first interaction-based representation and one or more second interaction-based representations of one or more second media content items of the plurality of media content items;

determining, based on the measure of similarity, that the first media content item is to be recommended; and outputting an indication of the first media content item responsive to determining that the first media content item is to be recommended, the indication recommending the first media content item.

10. The system of claim 9, wherein the description-based representation of the first media content item is a description-based embedding representative of a plot description of the first media content item.

11. The system of claim 9, wherein the image-based representation of the first media content item is an image-based embedding representative of a thumbnail image associated with the first media content item.

12. The system of claim 9, wherein the metadata-based representation of the first media content item is a metadata-based embedding representative of at least one of:

a title of the first media content item;

a category of the first media content item indicative of a media type of the first media content item;

a genre of the first media content item;

a rating of the first media content item; or names of cast and crew members associated with the first media content item.

13. The system of claim 9, wherein each of the one or more second interaction-based representations of the one or more second media content items is an embedding representative of at least one interaction by a consumer with a corresponding second media content item of the one or more second media content items, and wherein the at least one interaction comprises:

the consumer clicking on a graphical user interface representation of the corresponding second media content item;

the consumer selecting the corresponding second media content item for playback; or the consumer being shown the graphical user interface representation of the corresponding second media content based on a submission of a search query.

14. The system of claim 9, wherein determining the measure of similarity comprises:

determining a cosine similarity between the first interaction-based representation and the one or more second interaction-based representations, wherein the measure of similarity corresponds to the cosine similarity.

15. The system of claim 9, wherein the at least one machine learning model comprises a multimodal machine learning model and a graph-based machine learning model, and wherein obtaining, from the at least one machine learning model, at least one of the description-based representation of the first media content item, the image-based representation of the first media content item, or the metadata-based representation of the first media content item comprises:

obtaining, from the multimodal machine learning model, at least one of the description-based representation of the first media content item and the image-based representation of the first media content item; and obtaining, from the graph-based machine learning model, the metadata-based representation of the first media content item.

16. The system of claim 15, wherein the multimodal machine learning model is a contrastive language-image pre-training (CLIP)-based multimodal machine learning model.

17. A non-transitory computer-readable medium having instructions stored thereon that, when executed by at least one computing device, cause the at least one computing device to perform operations comprising:

determining a first media content item, from a plurality of media content items, that is unassociated with interaction-based data;

obtaining, from at least one machine learning model, at least one of a description-based representation of the first media content item, an image-based representation of the first media content item, or a metadata-based representation of the first media content item;

providing, as an input to a neural network, at least one of the description-based representation of the first media content item, the image-based representation of the first media content item, or the metadata-based representation of the first media content item;

receiving, as an output from the neural network, a first interaction-based representation of the first media content item based on at least one of the description-based representation, the image-based representation, or the metadata-based representation;

determining a measure of similarity between the first interaction-based representation and one or more second interaction-based representations of one or more second media content items of the plurality of media content items;

determining, based on the measure of similarity, that the first media content item is to be recommended; and outputting an indication of the first media content item responsive to determining that the first media content item is to be recommended, the indication recommending the first media content item.

18. The non-transitory computer-readable medium of claim 17, wherein the description-based representation of the first media content item is a description-based embedding representative of a plot description of the first media content item.

19. The non-transitory computer-readable medium of claim 17, wherein the image-based representation of the first media content item is an image-based embedding representative of a thumbnail image associated with the first media content item.

20. The non-transitory computer-readable medium of claim 17, wherein the metadata-based representation of the first media content item is a metadata-based embedding representative of at least one of:

a title of the first media content item;

a category of the first media content item indicative of a media type of the first media content item;

a genre of the first media content item;

a rating of the first media content item; or names of cast and crew members associated with the first media content item.

\* \* \* \* \*